US008210497B2

(12) United States Patent
Ko

(10) Patent No.: US 8,210,497 B2
(45) Date of Patent: Jul. 3, 2012

(54) DOUBLE WATER-SEAL ACCUMULATOR FOR PERFUME DISPENSER

(76) Inventor: Chuan-Wei Ko, Chung-Li (TW)

( * ) Notice: Subject to any disclaimer, the term of this patent is extended or adjusted under 35 U.S.C. 154(b) by 425 days.

(21) Appl. No.: 12/569,894

(22) Filed: Sep. 29, 2009

(65) Prior Publication Data

US 2011/0073623 A1 Mar. 31, 2011

(51) Int. Cl.

| | |
|---|---|
| ***B65D 83/00*** | (2006.01) |
| ***B67D 3/00*** | (2006.01) |
| ***E03B 1/00*** | (2006.01) |
| ***F16K 31/44*** | (2006.01) |
| ***F16K 5/00*** | (2006.01) |

(52) U.S. Cl. ................... 251/258; 222/505; 137/614.11; 251/310

(58) Field of Classification Search .................. 222/631, 222/630, 3, 505, 506, 507, 402.1, 394; 251/254, 251/258, 310, 83, 259; 137/614, 11
See application file for complete search history.

*Primary Examiner* — Kevin P Shaver
*Assistant Examiner* — Stephanie E Williams

(57) ABSTRACT

A double water-seal accumulator used in a perfume dispenser includes a casing defining a vertical guide groove, an adapter defining a vertical guide hole and transverse guide groove, a stop ball supported on a spring member in the vertical guide hole and forced by the spring member to block the passage between the vertical guide hole and the transverse guide groove, a shaft member mounted in the casing and defining therein an angled hole and having a bottom raised portion, and an operating member coupled to the shaft member and operable to rotate the shaft member to a predetermined position where the angled hole is kept in communication with the vertical guide groove and the raised portion is stopped against the stop ball to open the passage between the vertical guide hole and the transverse guide groove.

4 Claims, 8 Drawing Sheets

DOUBLE WATER-SEAL ACCUMULATOR FOR PERFUME DISPENSER

BACKGROUND OF THE INVENTION

1. Field of the Invention

The present invention relates to a perfume dispenser and more particularly, to a double water-seal accumulator for perfume dispenser, which prevents perfume leakage or overflow during transportation under a hot environment.

2. Description of the Related Art

A perfume dispenser is known using a compression ball to generate a flow of air, thereby carrying perfume out of a dispenser head in a mist. However, during delivery of perfume dispensers, the internal pressure of perfume dispensers may increase when hot. When the internal pressure of a perfume dispenser rises, the contained perfume may be caused to flow out of the dispenser head. A perfume dispenser will be regarded as a defective product when it leaks.

SUMMARY OF THE INVENTION

The present invention has been accomplished under the circumstances in view. It is one object of the present invention to provide a double water-seal accumulator for perfume dispenser, which effectively prohibits accidental perfume leakage or overflow. It is another object of the present invention to provide a double water-seal accumulator for perfume dispenser, which provides a lever for shifting by a user to close/open the perfume passage.

To achieve these and other objects of the present invention, a double water-seal accumulator comprises a casing defining a vertical guide groove, an adapter defining a vertical guide hole and transverse guide groove in communication between the transverse guide groove and the vertical guide hole, a stop ball supported on a spring member in the vertical guide hole and forced by the spring member to block the passage between the vertical guide hole and the transverse guide groove, a shaft member mounted in the casing and defining therein an angled hole and having a bottom raised portion, and an operating member coupled to the shaft member. The operating member has a lever for operation by a user to rotate the shaft member between an open position where the angled hole is kept in communication with the vertical guide groove and the raised portion is stopped against the stop ball to open the passage between the vertical guide hole and the transverse guide groove, and a close position where the angled hole is moved away from the vertical guide groove and the stop ball is released from the raised portion of the shaft member and forced by the spring member to block the passage between the vertical guide hole and the transverse guide groove again.

DETAILED DESCRIPTION OF THE PREFERRED EMBODIMENT

Figure 1:
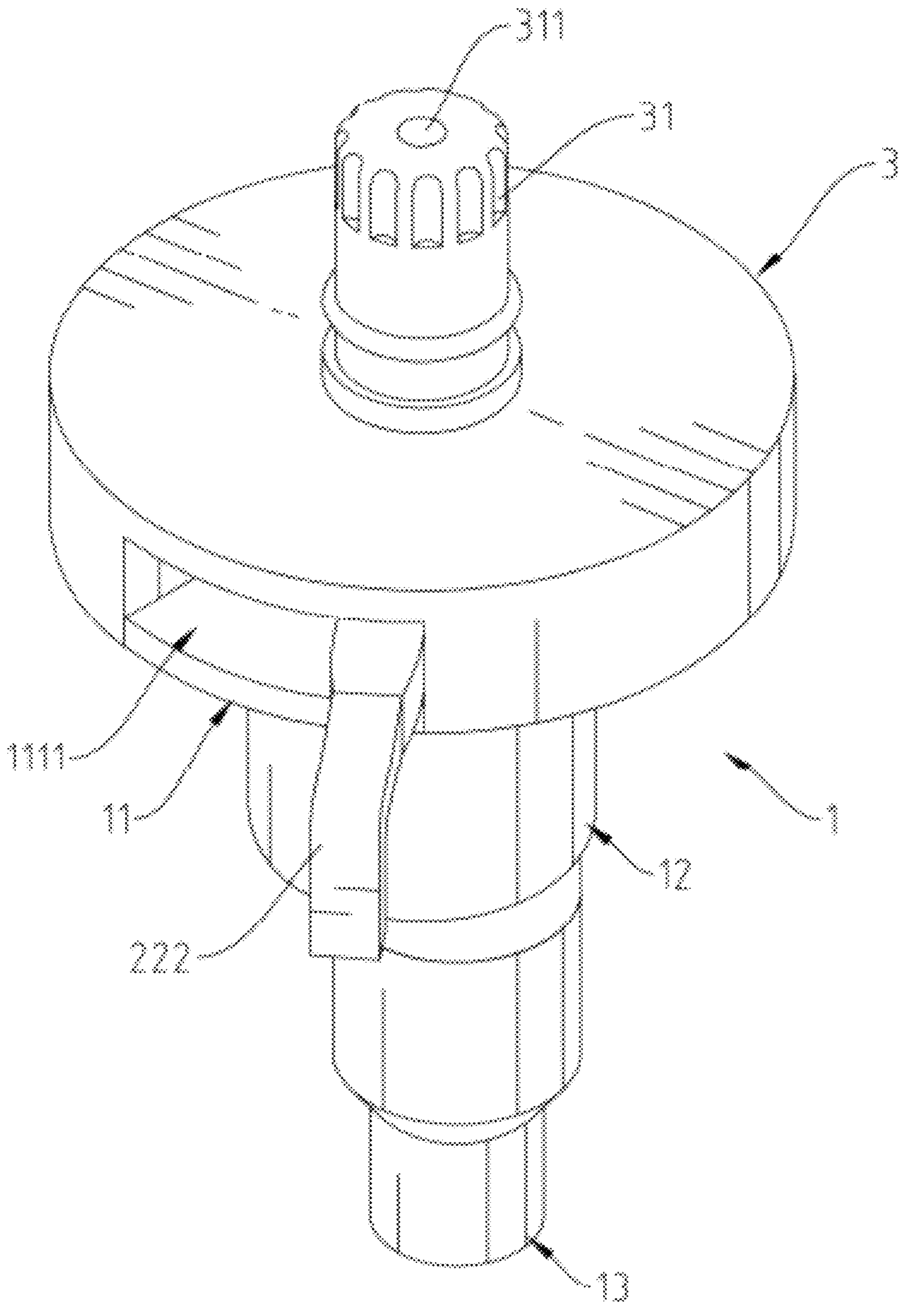
FIG. 1 is an elevational view of an accumulator for perfume dispenser in accordance with the present invention.
Figure 2:
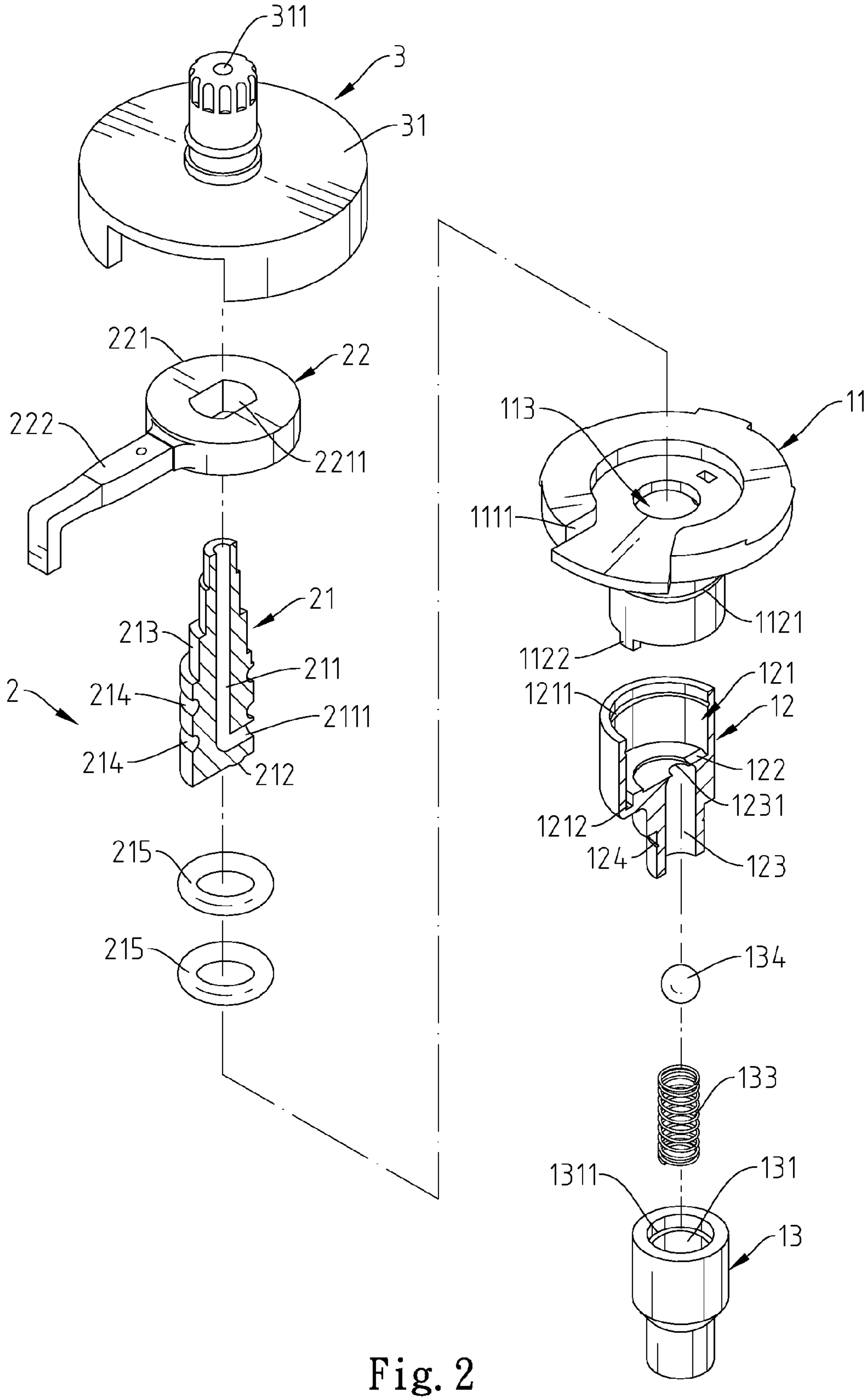
FIG. 2 is an exploded view of the accumulator for perfume dispenser in accordance with the present invention.
Figure 3:
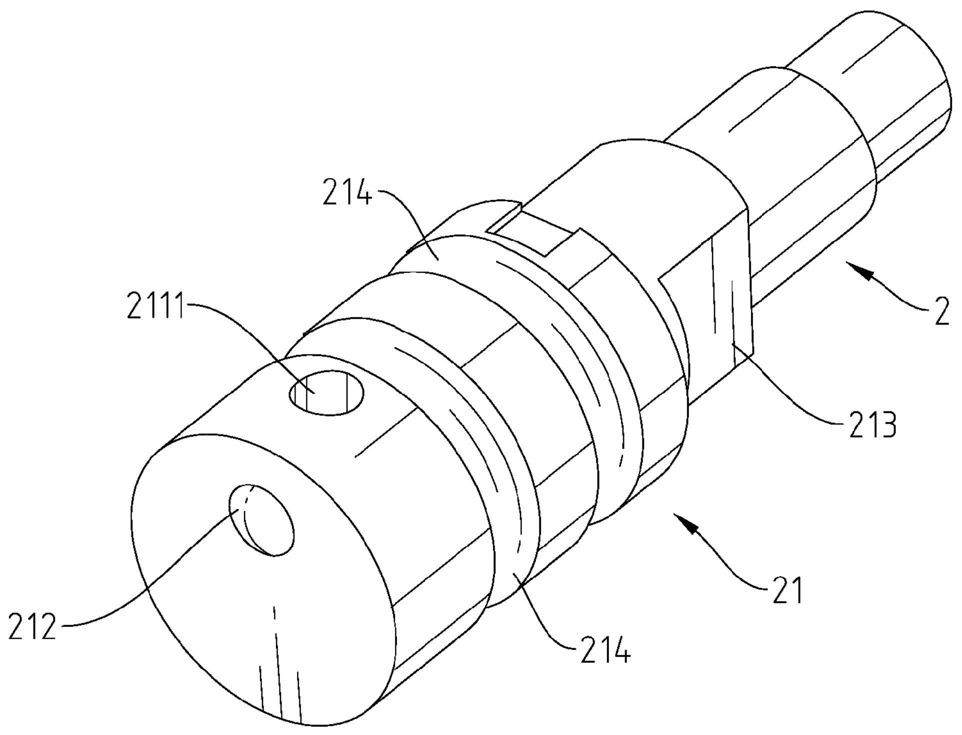
FIG. 3 is an elevational view of the stepped shaft member of the shaft unit of the double water-seal accumulator in accordance with the present invention.
Figure 4:
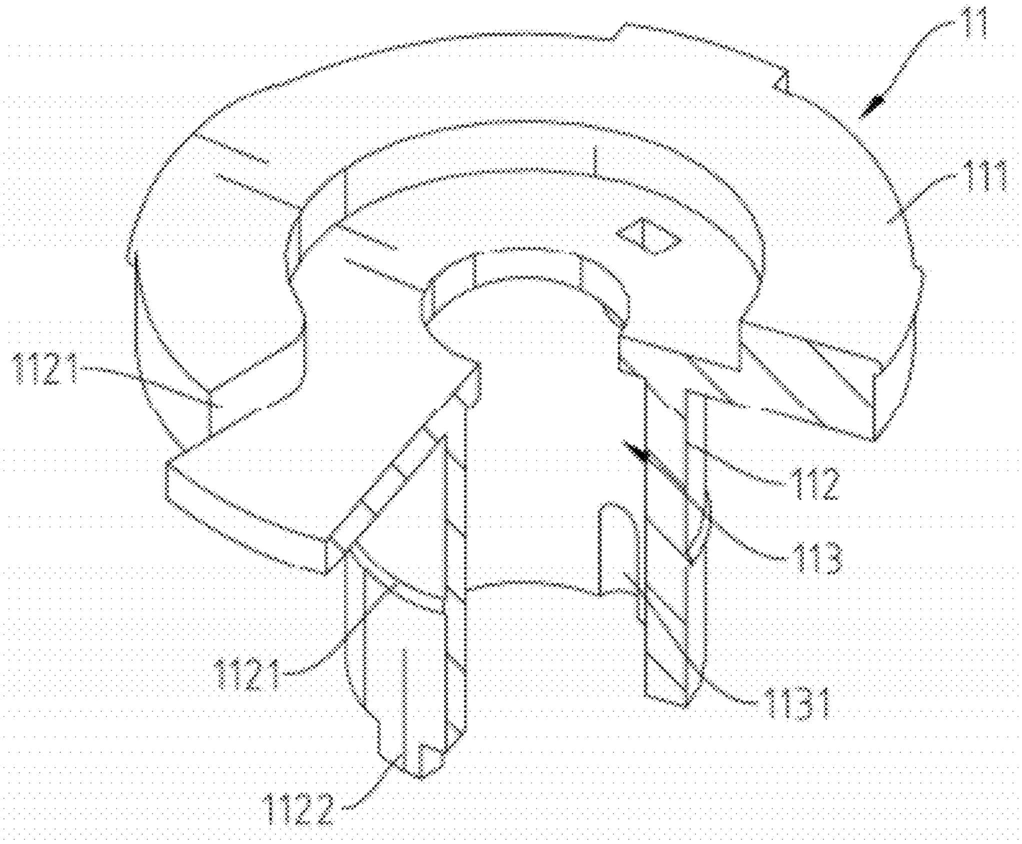
FIG. 4 is a sectional elevation of the casing of the body unit of the double water-seal accumulator in accordance with the present invention.
Figure 5:
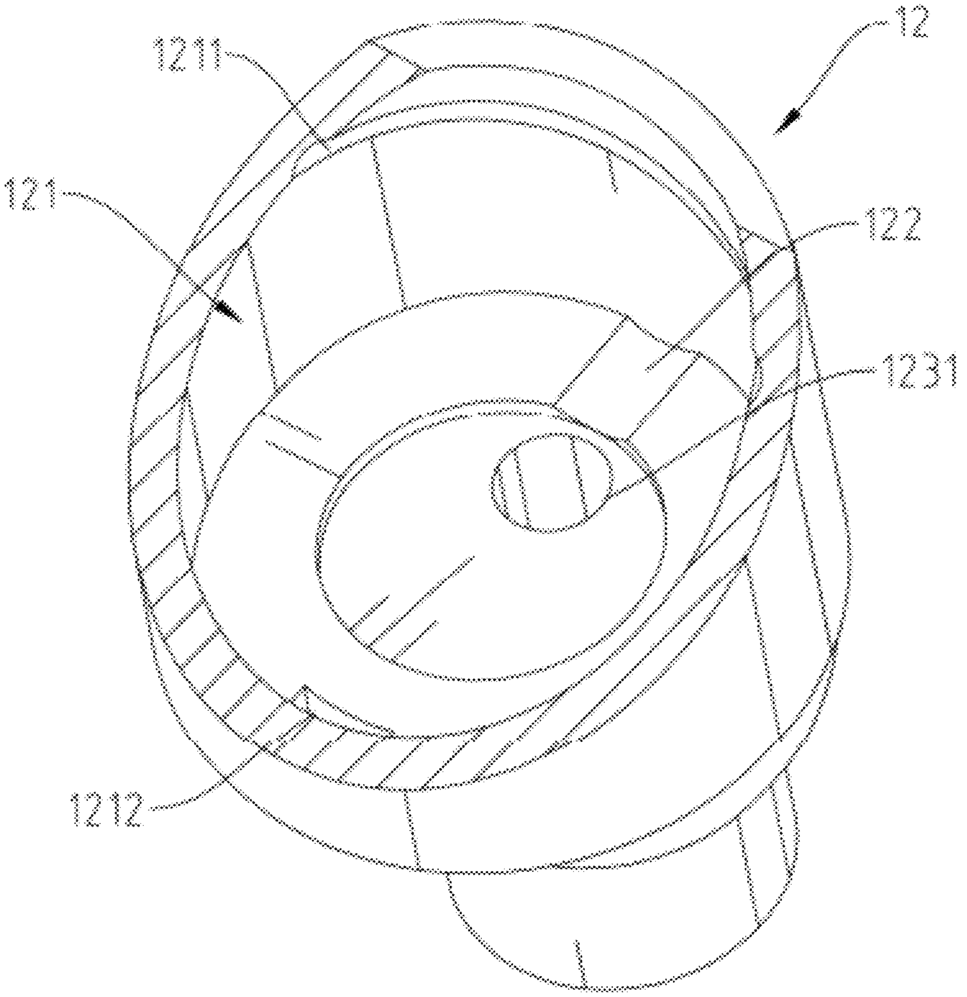
FIG. 5 is a sectional elevation of the adapter of the body unit of the double water-seal accumulator in accordance with the present invention.
Figure 6:
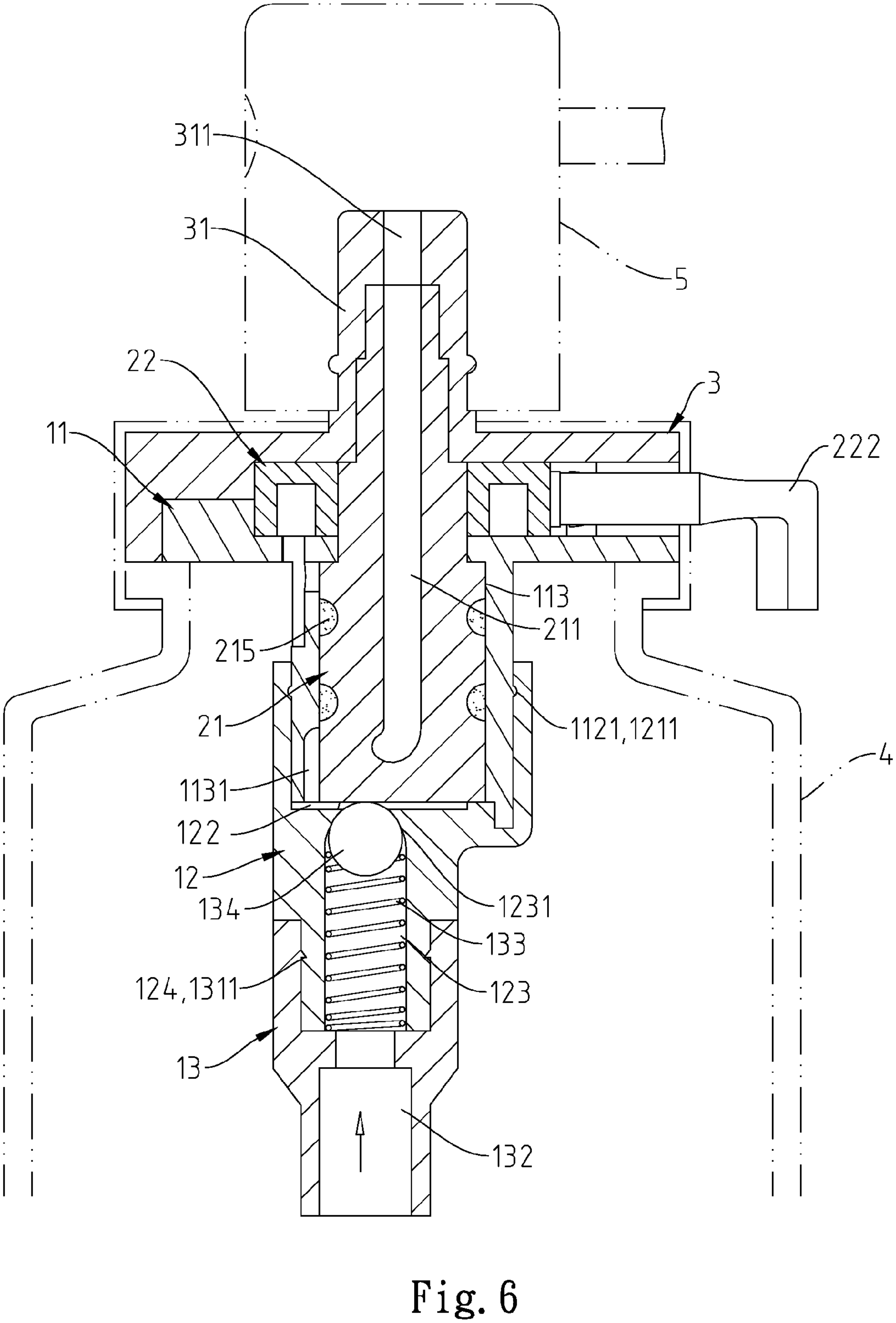
FIG. 6 is a schematic sectional view of the present invention, showing the accumulator in the closed status.
Figure 7:
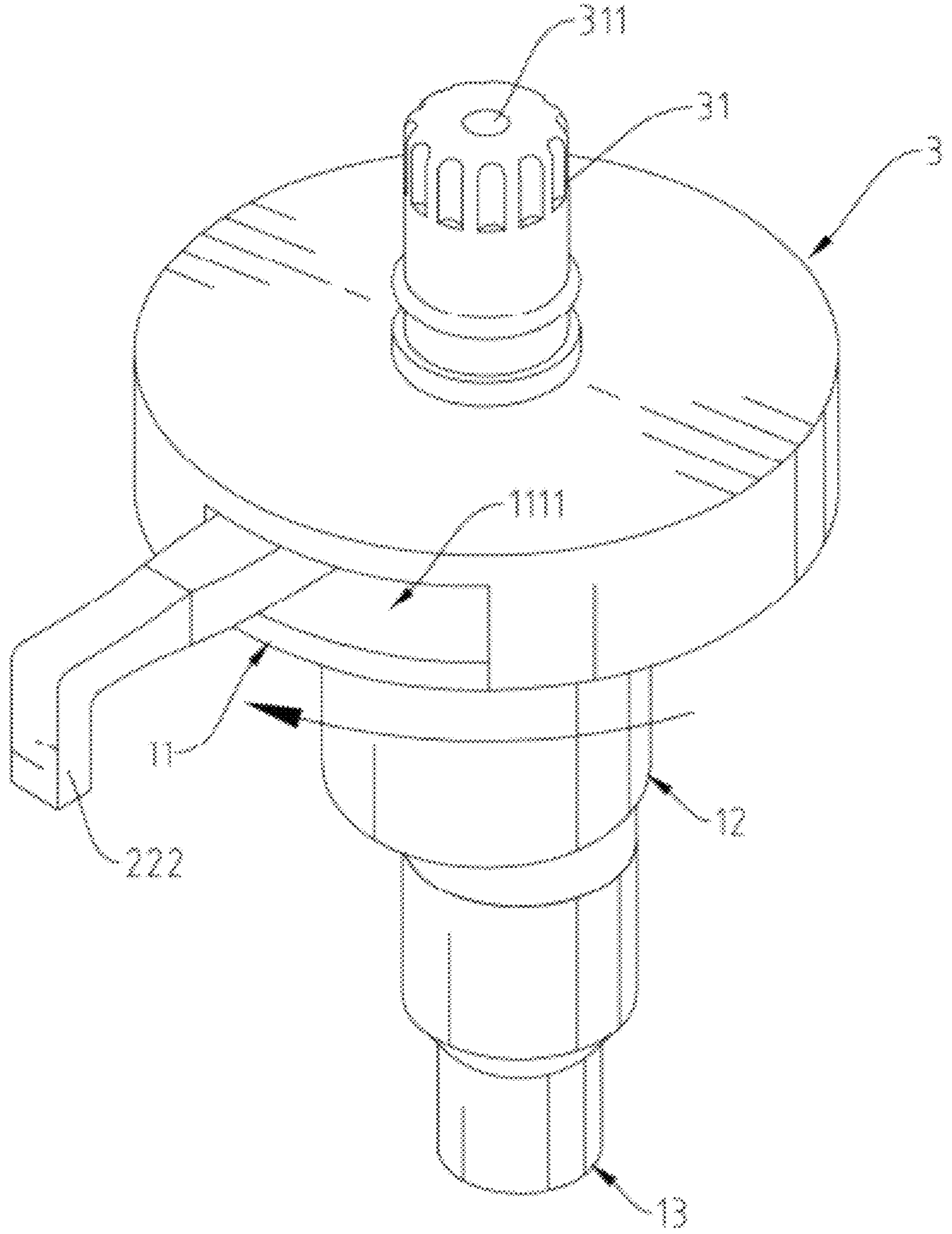
FIG. 7 is a schematic elevational view of the present invention, showing the lever of the shaft unit shifted to one side of the radial sliding way.
Figure 8:
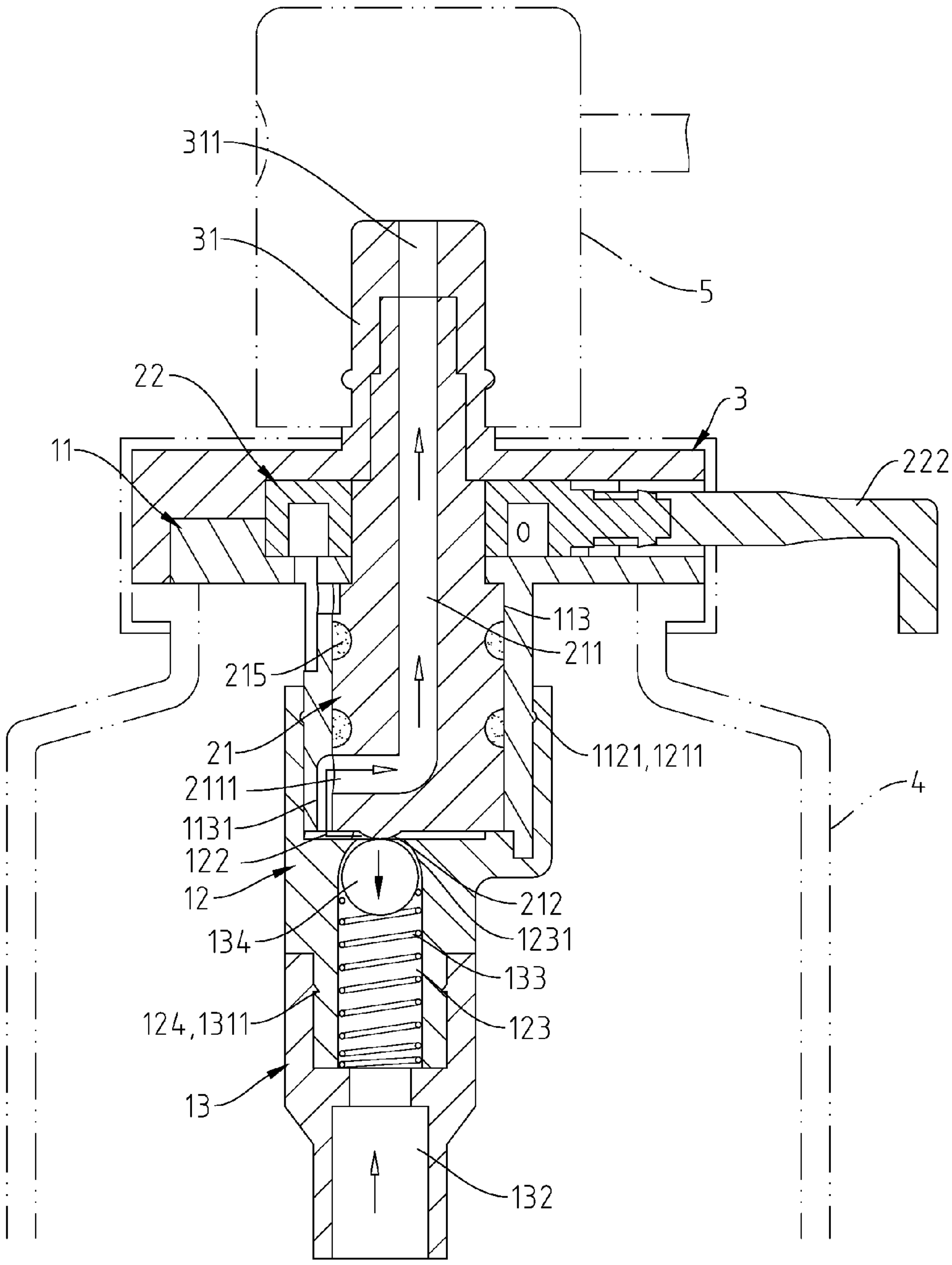
FIG. 8 is a schematic sectional view of the present invention, showing the accumulator in the open status.

Referring to FIGS. 1~6, a double water-seal accumulator for perfume dispenser in accordance with the present invention is shown comprising a body unit 1, a shaft unit 2 and a top cap 3.

The body unit 1 comprises a casing 11, an adapter 12 and a connector 13. The casing 11 comprises a base 111, a radial sliding way 1111 defined in the base 111, a bottom extension tube 112 downwardly extended from the bottom side of the base 111, a first accommodation chamber 113 defined in the bottom extension tube 112, a vertical guide groove 1131 located on the inside wall of the bottom extension tube 112 at the bottom within the first accommodation chamber 113, a first locating flange 1121 extending around the periphery of the bottom extension tube 112 on the middle, and a protruding rod 1122 downwardly extended from the bottom side of the bottom extension tube 112. The adapter 12 comprises a top adapter chamber 121, a first locating groove 1211 extending around the inside wall of the top adapter chamber 121, a transverse guide groove 122 transversely located on the inner bottom wall of the top adapter chamber 121 at one lateral side, a locating hole 1212 vertically located on the inner bottom wall of the top adapter chamber 121 at an opposite lateral side, a vertical guide hole 123 vertically upwardly extended from the bottom side of the adapter 12 to the top adapter chamber 121 in communication with the transverse guide groove 122, a stop flange 1231 transversely partially projecting into the top end of the vertical guide hole 123 near the transverse guide groove 122, and a second locating flange 124 extending around the periphery of the adapter 12 near the bottom side. The connector 13 comprises a top coupling hole 131, which accommodates a spring member 133 and a stop ball 134 that is supported on the spring member 133, a bottom water hole 132 in communication with the top coupling hole 131, and a second locating groove 1311 extending around the inside wall of the connector 13 within the top coupling hole 131.

The shaft unit 2 comprises a stepped shaft member 21 and an operating member 22. The stepped shaft member 21 comprises a angled hole 211 axially downwardly extended from the topmost edge, a transverse hole 2111 perpendicularly extended from the bottom end of the angled hole 211 to the periphery, a raised portion 212 protruded from the bottom end edge, a polygonal driven portion 213 located on the periphery near the top end, and a plurality of locating grooves 214 extending around the periphery at different elevations. Further, gasket rings 215 are respectively mounted in the locating grooves 214 around the periphery of the stepped shaft member 21. The operating member 22 comprises a coupling portion 221, a polygonal coupling hole 2211 cut through the mounting portion 221 for coupling to the a polygonal driven portion 213 of the stepped shaft member 21, and a lever 222 extended from the coupling portion 221.

The top cap 3 comprises a cap body 31 and an axial hole 311 axially cut through the center of the cap body 31.

During installation, insert the adapter 12 into the top coupling hole 131 of the connector 13 to couple the second locating flange 124 of the adapter 12 to the second locating groove 1311 of the connector 13 and to have the spring member 133 and the stop ball 134 be received in the vertical guide hole 123 of the adapter 12, and then insert the stepped shaft member 21 into the top adapter chamber 121 of the adapter 12, and then attach the casing 11 to the adapter 12 to insert the bottom extension tube 112 of the casing 11 into the top adapter chamber 121 of the adapter 12 and to have the first locating flange 1121 be coupled to the first locating groove 1211 and the protruding rod 1122 be positioned in the locating hole 1212. At this time, the polygonal driven portion 213 of the stepped shaft member 21 is exposed to the outside of the base 111, and the gasket rings 215 that are fastened to the periphery of the stepped shaft member 21 are kept in positive contact with the inside wall of the first accommodation chamber 113 to prevent leakage. Thereafter, couple the polygonal coupling hole 2211 of the coupling portion 221 of the operating member 22 to the polygonal driven portion 213 of the stepped shaft member 21 to have the lever 222 be disposed in the radial sliding way 1111, and then cap the top cap 3 on the exposed upper part of the stepped shaft member 21 and the casing 11.

Referring to FIGS. 1~6 again, during application of the present invention, the body unit 1 is mounted in a perfume bottle 4 and the cap body 31 of the top cap 3 is mounted with a dispenser head 5. The perfume bottle 4 and the dispenser head 5 are of the known members and not within the scope of the present invention, and therefore no further detailed description in this regard is necessary. Further, when not in use, the lever 222 is shifted to one side of the radial sliding way 1111 so that the stepped shaft member 21 is rotated in one direction to move the raised portion 212 away from the vertical guide hole 123 of the adapter 12, for enabling the stop ball 134 to be pushed upwards by the spring member 133 to stop against the stop flange 1231 and to further block the passage of the vertical guide hole 123. Thus, the perfume contained in the perfume bottle 4 cannot be sucked through the vertical guide hole 123 into the transverse guide groove 122. Further, when the stop ball 134 is stopped against the stop flange 1231 to block the passage of the vertical guide hole 123, the transverse hole 2111 and the vertical guide groove 1131 are kept apart and not in communication with each other, and therefore the perfume is prohibited from flowing through the vertical guide groove 1131 into the angled hole 211 for dispensing through the dispenser head 5 even if the stop ball 134 is forced away from the stop flange 1231 by accident, preventing perfume leakage.

Referring to FIGS. 2, 4 and 5 again, when using the perfume dispenser, shift the lever 222 to the other side of the radial sliding way 1111 to rotate the stepped shaft member 21 in the reversed direction and to further move the raised portion 212 to the vertical guide hole 123 of the adapter 12, causing the raised portion 212 to force the stop ball 134 downwards away from the stop flange 1231 against the spring member 133 to stop against, thereby opening the passage of the vertical guide hole 123. At this time, the vertical guide hole 123 is in communication with the transverse guide hole 122. When the vertical guide hole 123 and the transverse guide hole 122 are kept in communication with each other, the transverse hole 2111 and the vertical guide groove 1131 are kept in communication with each other, and therefore the perfume is allowed to flow through the vertical guide groove 1131 into the angled hole 211 for dispensing through the dispenser head 5.

When the user does not use the perfume dispenser, shift the lever 222 to the other side in the radial sliding way 1111 (see FIG. 1).

What the invention claimed is:

1. A double water-seal accumulator mounted in between a perfume bottle and a dispenser head of a perfume dispenser, comprising:

a body unit, said body unit comprising a casing, said casing comprising a first accommodation chamber, a vertical guide groove located on an inside wall of said first accommodation chamber at one side, an adapter, said adapter comprising a top adapter chamber that accommodates a lower part of said casing, a transverse guide groove transversely located on an inner bottom wall of said top adapter chamber at one side in communication with said vertical guide groove of said casing, a vertical guide hole vertically upwardly extended from a bottom side of said adapter to said top adapter chamber in communication with said transverse guide groove, a stop flange transversely partially projecting into a top end of said vertical guide hole near said transverse guide groove, a spring member mounted in said vertical guide hole of said adapter and a stop ball supported on said spring member and forced by said spring member against said stop flange to block said vertical guide hole of said adapter; and a shaft unit, said shaft unit comprising a stepped shaft member rotatably mounted in said first accommodation chamber of said casing, said stepped shaft member comprising a angled hole axially downwardly extended from the topmost edge thereof and a transverse hole perpendicularly extended from a bottom end of said angled hole to the periphery of said stepped shaft member and a raised portion protruded from a bottom end edge of said stepped shaft member, said raised portion being forced to move said stop ball away from said stop flange in opening said vertical guide hole of said adapter when said stepped shaft member is rotated relative to said casing to a predetermined position where said transverse hole is kept in communication with said vertical guide groove.

2. The double water-seal accumulator as claimed in claim 1, wherein said body unit further comprises a connector, said connector comprising a top coupling hole coupled to said adapter and a bottom water hole in communication with said top coupling hole.

3. The double water-seal accumulator as claimed in claim 2, wherein said casing comprises a bottom extension tube accommodated in said top adapter chamber of said adapter and a first locating flange extending around the periphery of said bottom extension tube; said adapter comprises a first locating groove disposed inside said top adapter chamber and coupled to said first locating flange, and a second locating flange extending around the periphery of a lower part thereof; said connector comprises a second locating groove disposed in said top coupling hole and coupled to said second locating flange of said adapter.

4. The double water-seal accumulator as claimed in claim 1, wherein said casing comprises a radial sliding way; said stepped shaft member comprises a polygonal driven portion; said shaft unit further comprises an operating member, said operating member comprises a coupling portion, a polygonal coupling hole cut through said coupling portion and coupled to said polygonal driven portion of said stepped shaft member, and a lever extended from the periphery of said coupling portion through said radial sliding way to the outside of said casing for operation by a user to rotate said stepped shaft member relative to said casing.

* * * * *